United States Patent
Lin et al.

(10) Patent No.: US 12,425,903 B2
(45) Date of Patent: Sep. 23, 2025

(54) METHOD AND APPARATUS FOR ADJUSTING RANDOM ACCESS PARAMETER, AND DEVICE AND STORAGE MEDIUM

(71) Applicant: GUANGDONG OPPO MOBILE TELECOMMUNICATIONS CORP., LTD., Guangdong (CN)

(72) Inventors: Xue Lin, Guangdong (CN); Cong Shi, Guangdong (CN); Ning Yang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 473 days.

(21) Appl. No.: 17/814,664

(22) Filed: Jul. 25, 2022

(65) Prior Publication Data

US 2022/0361250 A1    Nov. 10, 2022

Related U.S. Application Data

(63) Continuation of application No. PCT/CN2020/075582, filed on Feb. 17, 2020.

(51) Int. Cl.
*H04W 74/0833* (2024.01)
*H04W 24/10* (2009.01)
*H04W 74/00* (2009.01)

(52) U.S. Cl.
CPC ....... *H04W 74/0833* (2013.01); *H04W 24/10* (2013.01); *H04W 74/004* (2013.01); *H04W 74/006* (2013.01)

(58) Field of Classification Search
CPC ... H04W 24/02; H04W 24/10; H04W 74/002; H04W 74/004; H04W 74/006; H04W 74/0833; H04W 74/0836; H04W 74/0838
See application file for complete search history.

(56) References Cited

U.S. PATENT DOCUMENTS

| | | | |
|---|---|---|---|
| 2011/0051609 A1* | 3/2011 | Ishii | H04B 1/707 370/252 |
| 2022/0210838 A1* | 6/2022 | Lei | H04W 74/0833 |
| 2022/0217781 A1* | 7/2022 | Decarreau | H04W 24/02 |

FOREIGN PATENT DOCUMENTS

| CN | 103096355 A | 5/2013 |
|---|---|---|
| CN | 105792380 A | 7/2016 |

(Continued)

OTHER PUBLICATIONS

CATT (Rapporteur) "Output of Email Discussion [107#45][NRSON] RACH and Mobility Robustness Optimisation Checking" R2-1912147; 3GPP TSG-RAN WG2 Meeting #107bis; Chongqing, P.R. China; Oct. 14-18, 2019. 38 pages.

(Continued)

*Primary Examiner* — Kevin C. Harper
(74) *Attorney, Agent, or Firm* — Perkins Coie LLP (57) ABSTRACT

Disclosed are a method and apparatus for adjusting a random access parameter, and a device and a storage medium. The method comprises: a first terminal device sending a random access report to a network device, wherein the random access report is used to indicate a random access situation of the first terminal device; the random access report is used by the network device to adjust a random access parameter; the random access parameter is used by a second terminal device to select a random access type; and the random access type comprises two-step random access and four-step random access. Provided is a method for adjusting a random access parameter, wherein a network device adjusts a random access parameter on the basis of a random access situation of a terminal device that has completed random access, such that the adjustment of a random access parameter can be more accurate.

11 Claims, 7 Drawing Sheets

(56) References Cited

FOREIGN PATENT DOCUMENTS

| CN | 109076500 A | 12/2018 | | |
|---|---|---|---|---|
| WO | 2019032001 A1 | 2/2019 | | |
| WO | WO-2020032760 A1 | * | 2/2020 | ........... H04B 17/318 |
| WO | WO-2020227858 A1 | * | 11/2020 | |

OTHER PUBLICATIONS

Extended European Search Report for European Application No. 20920375.1 issued Sep. 26, 2022. 10 pages.

OPPO "Remaining stage-2 open issues for 2-step RACH" R2-1912086; 3GPP TSG-RAN WG2 Meeting #107bis; Chongqing, China; Oct. 14-18, 2019. 4 pages.

ZTE Corporation et al. "Further considerations on RACH optimization" R2-2000805; 3GPP TSG RAN WG2 #109-e; Electronic Meeting; Feb. 24-Mar. 6, 2020. 7 pages.

3GPP TS 38.300 V16.1.0 (Mar. 2020)—3rd Generation Partnership Project; Technical Specification Group Radio Access Network; NR; NR and NG-RAN Overall Description; Stage 2 (Release 16) (133 pages).

3GPP TS 38.321 V15.8.0 (Dec. 2019)—3rd Generation Partnership Project; Technical Specification Group Radio Access Network; NR; Medium Access Control (MAC) protocol specification (Release 15) (78 pages).

3GPP TS 38.331 V15.8.0 (Dec. 2019)—3rd Generation Partnership Project; Technical Specification Group Radio Access Network; NR; Radio Resource Control (RRC) protocol specification (Release 15) (529 pages).

3GPP TSG RAN WG1 #98bis—Chongqing, China, Oct. 14-20, 2019—R1-1910160—CMCC, Discussion on Procedure of 2-Step RACH (7 pages).

International Search Report mailed Oct. 27, 2020 of PCT /CN2020/075582 (4 pages).

Written Opinion mailed Oct. 27, 2020 of PCT /CN2020/075582 (9 pages).

Second Office Action of the Chinese application No. 202210869541.2, issued on Dec. 28, 2023. 16 pages with English translation.

Examination Report of the European application No. 20920375.1, issued on Dec. 21, 2023. 6 pages.

Decision of Rejection of the Chinese application No. 202210869541.2, issued on Apr. 20, 2024. 14 pages with English translation.

Third Office Action of the European application No. 20920375.1, issued on Jun. 5, 2024. 7 pages.

First Office Action of the CN application No. 202210869541.2, issued on Aug. 19, 2023. 12 pages with English translation.

Examination Report of the EP application No. 20920375.1, issued on Jul. 4, 2023. 6 pages.

Fourth Office Action of the European application No. 20920375.1, issued on Dec. 19, 2024. 7 pages.

Examination Report for European Application No. 20920375.1 Issued Jun. 24, 2025, 9 Pages.

* cited by examiner

METHOD AND APPARATUS FOR ADJUSTING RANDOM ACCESS PARAMETER, AND DEVICE AND STORAGE MEDIUM

CROSS-REFERENCE TO RELATED APPLICATION

The present application is a continuation application of International PCT Application No. PCT/CN2020/075582, filed on Feb. 17, 2020, the entire content of which is hereby incorporated by reference.

TECHNICAL FIELD

Implementations of the present disclosure relate to the field of communication technology, and in particular to a method and an apparatus for adjusting a random access parameter, a device and a storage medium.

BACKGROUND

The 3rd Generation Partnership Project (3GPP) specifies a random access procedure for a terminal device in 5G New Radio (NR).

In the related art, when performing random access, a terminal device first selects an uplink carrier resource type, and then selects a random access type. The uplink carrier resource type includes a Supplementary Uplink (SUL) resource and a Normal Uplink (NUL) resource. A contention-based random access type includes contention-based two-step random access and contention-based four-step random access. Compared with the contention-based four-step random access, the contention-based two-step random access can reduce an access delay of the terminal device to a certain extent. In the process of performing random access, once the terminal device selects a certain random access type, the terminal device will always use a random access resource of that random access type for random access attempts, and will not change the random access type even if it fails in the middle, unless the number of random access attempts reaches a maximum value, at which time, the terminal device needs to perform random access initialization to re-perform the random access procedure.

However, in the related art, it is often the case that multiple terminal devices perform a same random access procedure at the same time. In such a case, if the multiple terminal devices happen to use a same preamble to initiate a random access request to a network device on a same time-frequency resource, the result is that only one terminal device can successfully access the network device, and other terminal devices will face a competition failure of random access and make a next random access attempt. In such a case, the delay for a terminal device to successfully access the network device is relatively long, and the efficiency of random access is relatively low.

SUMMARY

The implementations of the present disclosure provide a method and an apparatus for adjusting a random access parameter, a device and a storage medium. The technical solutions are as follows.

In one aspect, an implementation of the present disclosure provides a method for adjusting a random access parameter, which is applied to a first terminal device, the method including: sending a random access report to a network device, the random access report being used for indicating a random access situation of the first terminal device; the random access report being used for the network device to adjust a random access parameter;

wherein the random access parameter is used for a second terminal device to select a random access type, and the random access type includes two-step random access and four-step random access.

In another aspect, an implementation of the present disclosure provides a method for adjusting a random access parameter, which is applied to a network device, the method including:

receiving a random access report sent by a first terminal device, the random access report being used for indicating a random access situation of the first terminal device; and adjusting a random access parameter according to the random access report; wherein the random access parameter is used for a second terminal device to select a random access type, and the random access type includes two-step random access and four-step random access.

In a further aspect, an implementation of the present disclosure provides an apparatus for adjusting a random access parameter, which is applied to a first terminal device, the apparatus including:

a report sending module configured to send a random access report to a network device, the random access report being used for indicating a random access situation of the first terminal device; the random access report being used for the network device to adjust a random access parameter;

wherein the random access parameter is used for a second terminal device to select a random access type, and the random access type includes two-step random access and four-step random access.

In still a further aspect, an implementation of the present disclosure provides an apparatus for adjusting a random access parameter, which is applied to a network device, the apparatus including:

a report receiving module configured to receive a random access report sent by a first terminal device, the random access report being used for indicating a random access situation of the first terminal device; and a parameter adjusting module configured to adjust a random access parameter according to the random access report; wherein the random access parameter is used for a second terminal device to select a random access type, and the random access type includes two-step random access and four-step random access.

In still a further aspect, an implementation of the present disclosure provides a terminal device, including a processor and a transceiver connected with the processor; wherein the transceiver is configured to send a random access report to a network device, the random access report being used for indicating a random access situation of a first terminal device; the random access report being used for the network device to adjust a random access parameter;

wherein the random access parameter is used for a second terminal device to select a random access type, and the random access type includes two-step random access and four-step random access.

In still a further aspect, an implementation of the present disclosure provides a network device, including a processor and a transceiver connected with the processor; wherein the transceiver is configured to receive a random access report sent by a first terminal device, the random access report being used for indicating a random access situation of the first terminal device; and the processor is configured to adjust a random access parameter according to the random access report; wherein the random access parameter is used for a second terminal device to select a random access type, and the random access type includes two-step random access and four-step random access.

In still a further aspect, an implementation of the present disclosure provides a computer-readable storage medium, storing a computer program, the computer program being used for being executed by a processor of a terminal device to implement the method for adjusting a random access parameter on a first terminal device side.

In still a further aspect, an implementation of the present disclosure provides a computer-readable storage medium, storing a computer program, the computer program being used for being executed by a processor of a network device to implement the method for adjusting a random access parameter on a network device side.

In still a further aspect, an implementation of the present disclosure provides a chip, including a programmable logic circuit and/or a program instruction, used for implementing the method for adjusting a random access parameter on a first terminal device side, when the chip is run on a terminal device.

In still a further aspect, an implementation of the present disclosure provides a chip, including a programmable logic circuit and/or a program instruction, used for implementing the method for adjusting a random access parameter on a network device side, when the chip is run on a network device.

The technical solutions according to the implementations of the present disclosure may include the following beneficial effects.

By sending a random access report to a network device by a terminal device which has completed random access, the random access report being used for the network device to adjust a random access parameter, a method for adjusting a random access parameter is provided. Moreover, in an implementation of the present disclosure, the random access report is used for indicating a random access situation of the terminal device that has completed random access, so that after receiving the random access report, the network device may analyze the situation of performing random access by the terminal device which has completed random access, and adjust a random access parameter based on the random access situation of the terminal device which has completed random access, such that the adjustment of the random access parameter can be more accurate and accords with the service quality of the current network device. In addition, in an implementation of the present disclosure, the random access parameter is used for a terminal device that has not completed random access to select a random access type. Terminal devices may be unevenly distributed in a service range of a network device. If the random access parameter is not adjusted, there may occur the case that multiple terminal devices use a same random access procedure to make random access attempts at the same time, which may eventually result in a relatively long delay for a terminal device to successfully access the network device and a relatively low efficiency of random access. In an implementation of the present disclosure, after mastering a distribution situation of the terminal devices in the service range of the network device according to the random access report of the terminal device that has completed random access, the network device may adjust the random access parameter to avoid the case that multiple terminal devices perform a same random access procedure, reduce the delay for a terminal device to successfully access the network device, and improve the efficiency of random access.

DETAILED DESCRIPTION

In order to make objects, technical solutions, and advantages of the present disclosure clearer, implementations of the present disclosure will be described in further detail below with reference to the drawings.

Network architectures and service scenarios described in the implementations of the present disclosure are intended to illustrate the technical solutions of the implementations of the present disclosure more clearly, but do not constitute a limitation to the technical solutions provided by the implementations of the present disclosure. Those of ordinary skills in the art may know that with evolvement of network architectures and emergence of new service scenarios, the technical solutions provided by the implementations of the present disclosure are also applicable to similar technical problems.

Figure 1:
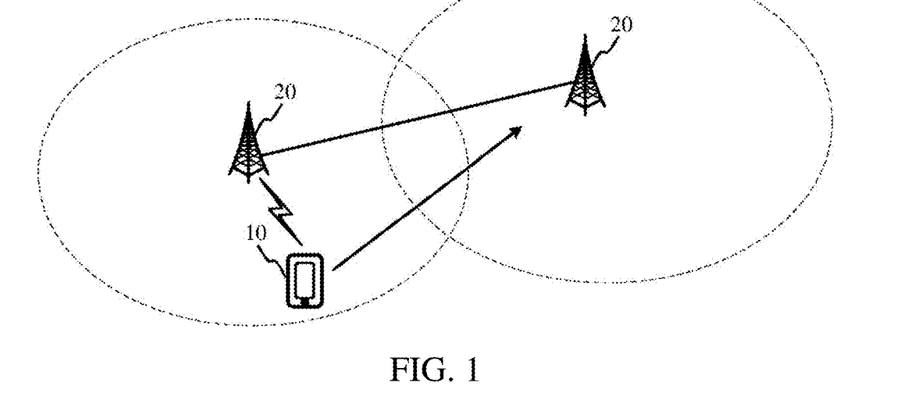
FIG. 1 is a schematic diagram of a network architecture according to an implementation of the present disclosure.

Referring to FIG. 1, FIG. 1 is a schematic diagram of a network architecture according to an implementation of the present disclosure. The network architecture may include: a terminal device 10 and a network device 20.

There are usually multiple terminal devices 10, and one or more terminal devices 10 may be distributed in a cell managed by each network device 20. The terminal device 10 may include various handheld devices, vehicle-mounted devices, wearable devices, computing devices with wireless communication functions, or other processing devices connected to a wireless modem, and various forms of User Equipment (UE), Mobile Stations (MS), and the like. For convenience of description, in the implementations of the present disclosure, the above-mentioned devices are collectively referred to as terminal devices.

The network device 20 is an apparatus deployed in an access network for providing wireless communication functions for the terminal device 10. The network device 20 may include various forms of macro base stations, micro base stations, relay stations, access points, etc. In systems employing different wireless access technologies, the names of devices with network device functions may be different, for example, in a 5G NR system, they are called gNodeB or gNB. With the evolution of communication technology, the name "network device" may change. For convenience of description, in the implementations of the present disclosure, the above-mentioned apparatuses for providing wireless communication functions for the terminal device 10 are collectively referred to as network devices.

The "5G NR system" in the implementations of the present disclosure may also be referred to as a 5G system or an NR system, and the meaning thereof will be understood by a person skilled in the art. The technical solutions described in the implementations of the present disclosure may be applied to the 5G NR system, and also to a subsequent evolution system of the 5G NR system.

Figure 2:
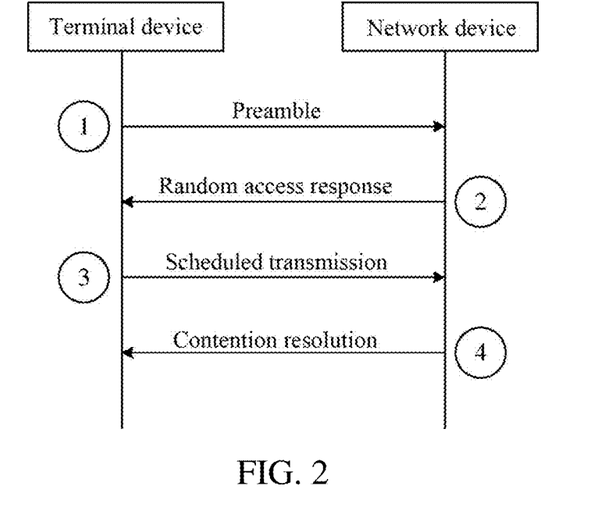
FIG. 2 is a flow chart of contention-based four-step random access according to an implementation of the present disclosure.
Figure 3:
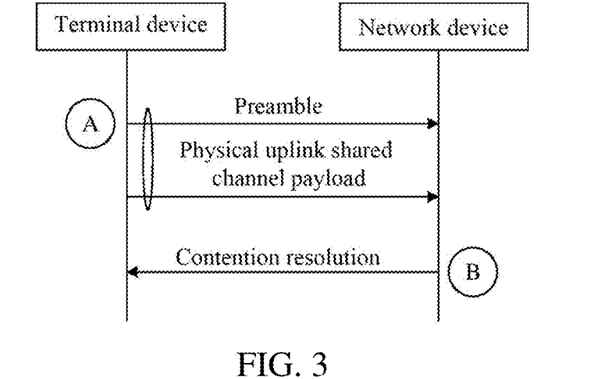
FIG. 3 is a flow chart of contention-based two-step random access according to an implementation of the present disclosure.

In Release 16 (R16), a contention-based two-step random access mechanism is introduced for the purpose of reducing the random access delay of a terminal device to a certain extent. FIG. 2 is a flow chart of contention-based four-step random access according to an implementation of the present disclosure, and FIG. 3 is a flow chart of contention-based two-step random access according to an implementation of the present disclosure. In FIG. 3, message A (MsgA) sent by a terminal device carries not only a preamble, but also a Physical Uplink Shared Channel (PUSCH) payload originally needed to be sent in message 3 (Msg3) of contention-based four-step random access (as shown in FIG. 2).

Since the transmission of a PUSCH payload has relatively high requirements for air interface channel situations, it is specified in NR that a terminal device needs to select and use a random access type according to cell quality. When the cell quality detected by the terminal device is higher than a threshold given by a network device, the terminal device uses contention-based two-step random access to access the network device; conversely, when the cell quality detected by the terminal device is lower than the threshold given by the network device, the terminal device uses contention-based four-step random access to access the network device.

In addition, a Random Access Channel occasion (RO) or a preamble resource when the terminal device uses contention-based two-step random access is orthogonal to an RO or a preamble resource when the terminal device uses contention-based four-step random access, that is to say, the terminal device using contention-based two-step random access and the terminal device using contention-based four-step random access use different resource pools for random access.

In addition, when performing random access, the terminal device first selects an uplink carrier type to be used, i.e., first selecting SUL or NUL, and then selects a random access type, i.e., selecting contention-based two-step random access or contention-based four-step random access. In the process of performing random access, once the terminal device selects a certain random access type, the terminal device will always use a random access resource of that random access type for random access attempts, and will not change the random access type even if it fails in the middle, unless the number of random access attempts reaches a maximum value, at that time, the terminal device needs to perform random access initialization to re-perform the random access procedure.

In an example, assume that the random access parameters given by the network device are as follows:

rsrp-ThresholdSSB-SUL=−70 dBm
rsrp-ThresholdTwoStepRA-SUL=−45 dBm
rsrp-ThresholdTwoStepRA=−85 dBm wherein "rsrp-ThresholdSSB-SUL" is used for indicating an uplink carrier type used by the terminal device, when Reference Signal Receiving Power (RSRP) detected by the terminal device is greater than the threshold, NUL is used, and when the RSRP detected by the terminal device is less than the threshold, SUL is used. "rsrp-ThresholdTwoStepRA-SUL" is used for indicating the random access type selected by the terminal device when using SUL, when the RSRP detected by the terminal device is greater than the threshold, SUL is used and contention-based two-step random access is selected, and when the RSRP detected by the terminal device is less than the threshold, SUL is used and contention-based four-step random access is selected. "rsrp-ThresholdTwoStepRA" is used for indicating the random access type selected by the terminal device when using NUL, when the RSRP detected by the terminal device is greater than the threshold, NUL is used and contention-based two-step random access is selected, and when the RSRP detected by the terminal device is less than the threshold, NUL is used and contention-based four-step random access is used.

Assume that there are four terminal devices, UE1, UE2, UE3 and UE4, and the values of RSRP detected by the four terminal devices at their locations are −34 dBm, −50 dBm, −74 dBm and −92 dBm respectively. For UE1, since −34 dBm is greater than −70 dBm, UE1 uses NUL, and since −34 dBm is greater than −45 dBm, UE1 selects contention-based two-step random access. In summary, UE1 uses NUL and selects contention-based two-step random access to access a network device. For UE2, since −50 dBm is greater than −70 dBm, UE2 uses NUL, and since −50 dBm is less than −45 dBm, UE2 selects contention-based four-step random access. In summary, UE2 uses NUL and selects contention-based four-step random access to access a network device. For UE3, since −74 dBm is less than −70 dBm, UE3 uses SUL, and since −74 dBm is greater than −85 dBm, UE3 selects contention-based two-step random access. In summary, UE3 uses SUL and selects contention-based two-step random access to access a network device. For UE4, since −92 dBm is less than −70 dBm, UE4 uses SUL, and since −92 dBm is less than −85 dBm, UE4 selects contention-based four-step random access. In summary, UE4 uses SUL and selects contention-based four-step random access to access a network device.

Figure 4:
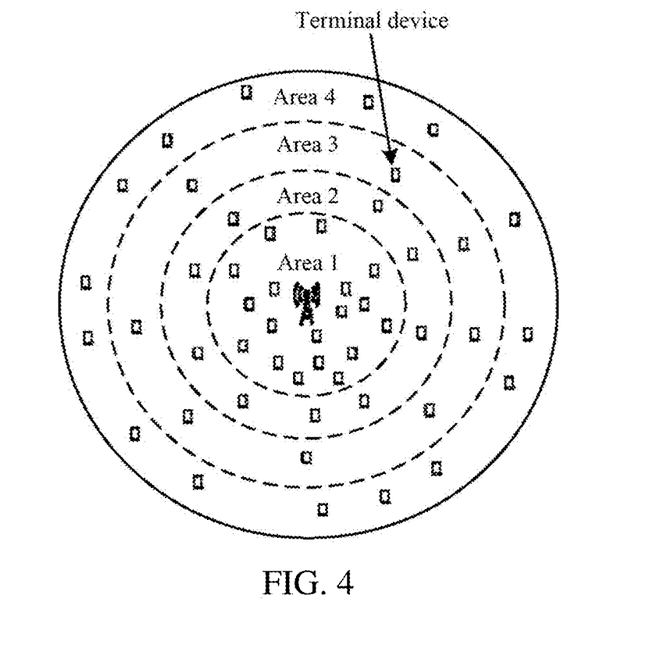
FIG. 4 is a schematic diagram of a service range of a network device according to an implementation of the present disclosure.
Figure 5:
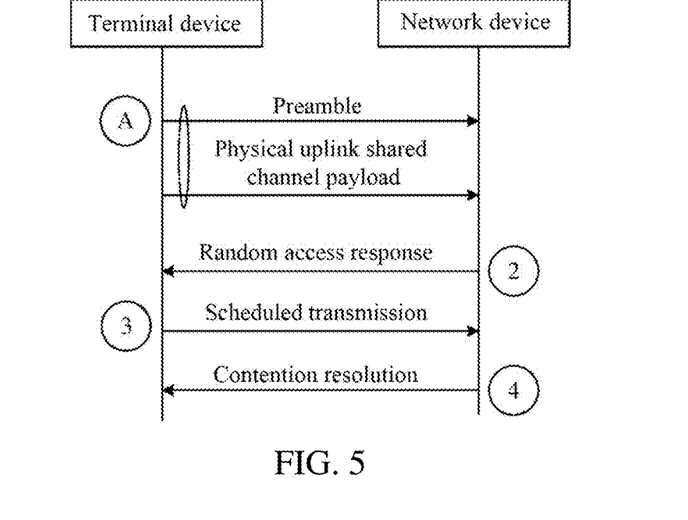
FIG. 5 is a flow chart of back-off from contention-based two-step random access to contention-based four-step random access according to an implementation of the present disclosure.

Based on the above discussion on the uplink carrier type and the random access type, as shown in FIG. 4, a service range of a network device may be divided into four areas according to the random access parameter, i.e., area 1, area 2, area 3 and area 4. The terminal devices in a certain area may use a same random access procedure, wherein a terminal device in area 1 uses NUL and selects contention-based two-step random access for random access attempts, a terminal device in area 2 uses NUL and selects contention-based four-step random access for random access attempts, a terminal device in area 3 uses SUL and selects contention-based two-step random access for random access attempts, and a terminal device in area 4 uses SUL and selects contention-based four-step random access for random access attempts. As shown in FIG. 4, the terminal devices in area 1 and area 2 all use the uplink carrier type NUL for random access. However, there are too many terminal devices in area 1, and this means that there will be too many terminal devices performing a same random access procedure at the same time. In such a case, if multiple terminal devices happen to use a same preamble to initiate a random access request to a network device on a same time-frequency resource, the result is that only one terminal device can successfully access the network device, and the other terminal devices will face a competition failure of random access and make a next random access attempt. And when the number of random access attempts reaches a maximum value, the terminal device needs to perform random access initialization to re-perform the random access procedure. At this time, some terminal devices in area 1 in FIG. 4 will back off from contention-based two-step random access to contention-based four-step random access. FIG. 5 is a flow chart of back-off from contention-based two-step random access to contention-based four-step random access according to an implementation of the present disclosure. As can be seen from FIG. 5, after a base station fails in decoding PUSCH information when the terminal device uses contention-based two-step random access for access, a random access response message, rather than a contention resolution message, is received from the network device. After receiving a random access response message, the terminal device sends Msg3 to the network device. In this case, the delay for the terminal device to successfully access the network device is relatively long, and the efficiency of random access is relatively low.

Based on this, an implementation of the present disclosure provides a method for adjusting a random access parameter. By sending a random access report to a network device by a terminal device which has completed random access, the random access report being used for the network device to adjust a random access parameter, a method for adjusting a random access parameter is provided. Moreover, in an implementation of the present disclosure, the random access report is used for indicating a random access situation of the terminal device that has completed random access, so that after receiving the random access report, the network device may analyze the situation of performing random access by the terminal device which has completed random access, and adjust a random access parameter based on the random access situation of the terminal device which has completed random access, such that the adjustment of the random access parameter can be more accurate and accords with the service quality of the current network device. In addition, in an implementation of the present disclosure, the random access parameter is used for a terminal device that has not completed random access to select a random access type. Terminal devices may be unevenly distributed in a service range of a network device. If the random access parameter is not adjusted, there may occur the case that multiple terminal devices use a same random access procedure to make random access attempts at the same time, which may eventually result in a relatively long delay for a terminal device to successfully access the network device and a relatively low efficiency of random access. In an implementation of the present disclosure, after mastering a distribution situation of the terminal devices in the service range of the network device according to the random access report of the terminal device that has completed random access, the network device may adjust the random access parameter to avoid the case that multiple terminal devices perform a same random access procedure, reduce the delay for a terminal device to successfully access the network device, and improve the efficiency of random access.

In addition, in a technical solution according to an implementation of the present disclosure, the random access report sent by a terminal device which has completed random access includes, but is not limited to, a random access type selected by the terminal device, a channel quality measurement result, and indication information indicating a relationship between the channel quality measurement result and a random access parameter. By analyzing the information, the network device may determine the random access procedure performed by the terminal device which has completed random access, thus facilitating the network device in analyzing the distribution situation of terminal devices in the service range of the network device.

In addition, in a technical solution according to an implementation of the present disclosure, the random access parameter may include a first threshold and a second threshold. The first threshold is used for a terminal device which has not completed random access to select a random access type when using NUL for random access, and the second threshold is used for a terminal device which has not completed random access to select a random access type when using SUL for random access. By adjusting the first threshold and/or the second threshold, the network device may enable the terminal devices in its service range to use different random access procedures for random access attempts, thereby providing specific contents that the random access parameter may include, and providing a specific manner in which the network device adjusts the random access parameter.

Next, the technical solutions of the present disclosure will be described in connection with several exemplary implementations.

Figure 6:
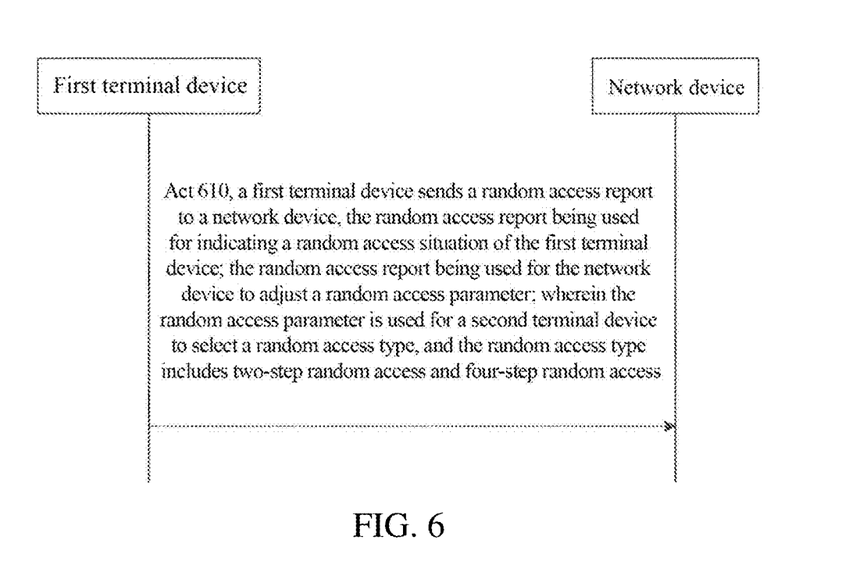
FIG. 6 is a flow chart of a method for adjusting a random access parameter according to an implementation of the present disclosure.

Referring to FIG. 6, FIG. 6 is a flow chart of a method for adjusting a random access parameter according to an implementation of the present disclosure. The method may be applied to the network architecture shown in FIG. 1. The method may include act 610.

In act 610, a first terminal device sends a random access report to a network device.

A terminal device may send a random access report to a network device when it completes a random access procedure. The random access report includes relevant information involved in the process of performing random access by the terminal device, which may be used for indicating a random access situation of the terminal device, for example, indicating the number of random access attempts by the terminal device, indicating a time-frequency resource used by the terminal device when performing random access, indicating a cell reference signal receiving power measured when the terminal device performs random access, etc. In an implementation of the present disclosure, the random access report received by the network device is used for indicating a random access situation of the first terminal device, i.e., the random access report includes relevant information involved in the process of performing random access by the first terminal device, wherein the first terminal device refers to a terminal device that has completed a random access procedure in the service range of the network device.

In an implementation of the present disclosure, the random access report is used for the network device to adjust a random access parameter. After receiving the random access report of the first terminal device, the network device may analyze the random access report, and analyze and process the random access report to determine a situation of performing random access by the first terminal device or determine a distribution situation of first terminal devices in the service range of the network device; and then the network device may adjust the random access parameter according to an analyzing and processing result of the random access report. For the random access parameter and the specific process of adjusting the random access parameter by the network device, please refer to the following optional implementations, and no further description is made here.

In an example, the random access report includes at least one of the following information.

(1) A Random Access Type Selected by the First Terminal Device.

The random access type refers to a random access mode selected by the first terminal device when performing random access. Optionally, the random access type may include two-step random access and four-step random access. The two-step random access may further include contention-based two-step random access and non-contention-based two-step random access. The four-step random access may further include contention-based four-step random access and non-contention-based four-step random access. In an implementation of the present disclosure, description is made merely by taking the case as an example where the random access type includes contention-based two-step random access and contention-based four-step random access. After knowing a technical solution of the present disclosure, a person skilled in the art will readily conceive of other technical solutions, such as the random access type including non-contention-based two-step random access and non-contention-based four-step random access, or the random access type including contention-based random access and non-contention-based random access, which should fall within the protection scope of the implementations of the present disclosure. For the description of contention-based two-step random access and contention-based four-step random access, please refer to the implementations corresponding to FIG. 2 and FIG. 3 above, and no further description is made here.

(2) A Channel Quality Measurement Result Collected by the First Terminal Device.

The channel quality measurement result refers to the results collected by the first terminal device in performing a random access procedure by performing measurement, calculation, etc. on the channel quality of the cell in which the first terminal device is located, and may be used for indicating a network service level of a network device corresponding to the cell. Optionally, the channel quality measurement result may include RSRP, Reference Signal Receiving Quality (RSRQ), Signal to Noise Ratio (SINR), Received Signal Strength Indication (RSSI), etc. In an implementation of the present disclosure, description is made merely by taking the case as an example where the channel quality measurement result includes RSRP, which, however, does not constitute a limitation on the specific content of the channel quality measurement result in the implementations of the present disclosure.

(3) First Indication Information.

In an implementation of the present disclosure, the first indication information is used for indicating the relationship between the channel quality measurement result collected by the first terminal device and the random access parameter. Optionally, the first indication information may refer to a magnitude relationship between the channel quality measurement result and the random access parameter. For example, the first indication information may be the channel quality measurement result being greater than the random access parameter. Optionally, the first indication information may refer to a difference between the channel quality measurement result and the random access parameter. For example, the first indication information may be a numerical value obtained by subtracting the random access parameter from the channel quality measurement result. Optionally, in order to enable the difference to reflect the magnitude relationship between the channel quality measurement result and the random access parameter, the difference has positive and negative attributes.

Optionally, the random access report also includes a value of absoluteFrequencyPointA.

The value of absolute frequency point A refers to a frequency value of a reference point of a frequency resource used by the terminal device. The value of absolute frequency point A may be used for the network device to determine an uplink carrier type used by the first terminal device, the uplink carrier type including NUL and SUL. Optionally, the network device is configured with a numerical range of absolute frequency point A for the terminal device using NUL and for the terminal device using SUL respectively, and after receiving the random access report of the first terminal device, the network device may determine, according to the value of absolute frequency point A in the random access report, the numerical range where the absolute frequency point A is located, thereby determining the uplink carrier type used by the first terminal device.

Figure 7:
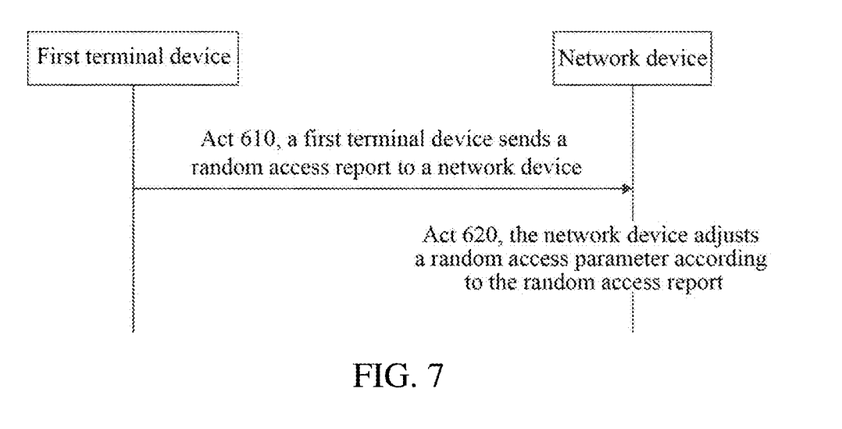
FIG. 7 is a flow chart of a method for adjusting a random access parameter according to another implementation of the present disclosure.

In a possible implementation, as shown in FIG. 7, the method further includes act 620.

In act 620, the network device adjusts the random access parameter according to the random access report.

In an implementation of the present disclosure, the random access parameter is used for a second terminal device to select a random access type, wherein the second terminal device refers to a terminal device which has not completed a random access procedure in the service range of the network device. The random access type includes two-step random access and four-step random access. In an implementation of the present disclosure, description is made merely by taking the case as an example where the random access type includes contention-based two-step random access and contention-based four-step random access. As described in the above implementations, the service range of the network device may be divided into four areas, and the terminal devices in a certain area may use a same random access procedure. If there are too many terminal devices in a certain area and too few terminal devices in other areas, the network device may adjust a range of an area, i.e., adjust the random access parameter, so as to ensure that the number of terminal devices in each area is moderate, thereby avoiding the case where a relatively large number of random access contention failures may occur because too many terminal devices use the same random access procedure for random access attempts, reducing the delay for the terminal device to successfully access the network device, and improving the efficiency of random access of the terminal device.

Figure 8:
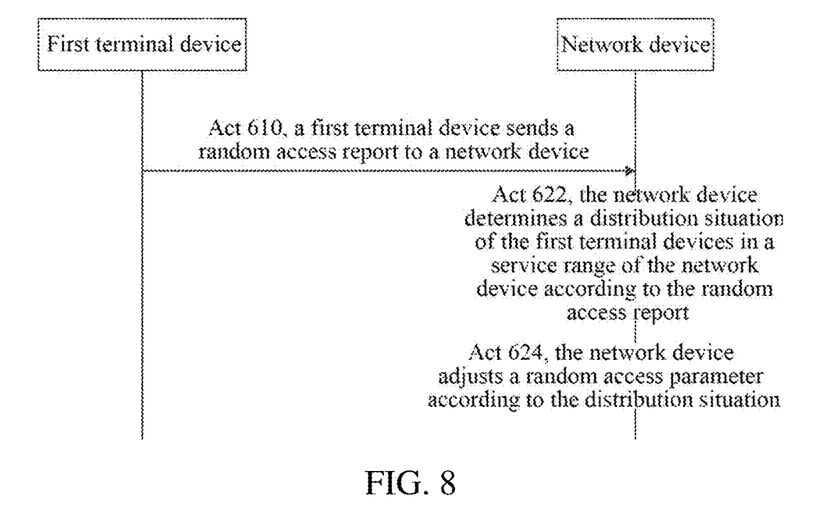
FIG. 8 is a flow chart of a method for adjusting a random access parameter according to a further implementation of the present disclosure.

In one example, as shown in FIG. 8, the above act 620 includes acts 622-624.

In act 622, the network device determines a distribution situation of first terminal devices in the service range of the network device according to the random access report.

After receiving the random access report, the network device may analyze the random access report and process the random access report to determine the distribution situation of the first terminal devices in the service range of the network device.

As an example, the random access report of the first terminal device includes a channel quality measurement result collected by the first terminal device, and the network device may compare the channel quality measurement result with the random access parameter, to determine the relationship between the channel quality measurement result and the random access parameter, so as to determine the distribution situation of the first terminal devices in the service range of the network device. For the description about the network device determining the random access procedure used by the first terminal device according to the channel quality measurement result and the random access parameter, please refer to the above implementations, and no further description is made here.

As an example, in order to reduce the processing overhead of the network device, the random access report of the first terminal device includes first indication information. The first indication information may indicate the relationship between the channel quality measurement result and the random access parameter, so as to avoid the case that the network device needs to first determine the relationship between the channel quality measurement result and the random access parameter according to the channel quality measurement result. Then the network device may determine the distribution situation of the first terminal devices in the service range of the network device according to the relationship.

As an example, in order to further reduce the processing overhead of the network device, the random access report of the first terminal device includes a value of absolute frequency point A and the random access type of the first terminal device. As described in the above implementation, the network device may acquire the uplink carrier type used by the first terminal device by acquiring the value of the absolute frequency point A. Based on this, if the random access report further includes the random access type selected by the first terminal device, the network device may directly determine the distribution situation of the first terminal devices in the service range of the network device.

In act 624, the network device adjusts the random access parameter according to the distribution situation.

After determining the distribution situation of the first terminal devices, the network device may determine the distribution situation of the terminal devices in each area in the service range of the network device. Optionally, the distribution situation of the terminal devices in each area may be represented by the number of first terminal devices or may be represented by the distribution density of the first terminal devices, which is not limited in the implementations of the present disclosure. After determining the distribution situation of the terminal devices in each area, the network device may adjust a range of an area according to the distribution situation, i.e., adjust the random access parameter, so that the number of terminal devices in each area is moderate and the terminal devices are evenly distributed in each area in the service range.

Figure 9:
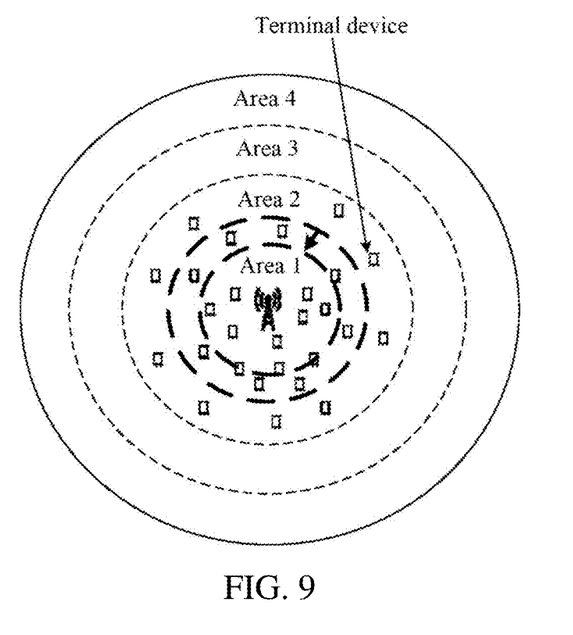
FIG. 9 is a schematic diagram of a method for adjusting a random access parameter according to an implementation of the present disclosure.

In one example, the random access parameter includes a first threshold. The first threshold is used for a second terminal device to select a random access type when using NUL for random access. Optionally, in an implementation of the present disclosure, the first threshold may be rsrp-ThresholdTwoStepRA described in the above implementation. As shown in FIG. 9, the first threshold is a demarcation between area 1 and area 2. When the second terminal devices are in area 1 and area 2, they all use NUL for random access. At this time, if the channel quality measurement result of the second terminal device is larger than the first threshold, two-step random access is selected, and if the channel quality measurement result of the second terminal device is less than the first threshold, four-step random access is selected. In the case where the network device determines, according to the random access report of the first terminal device, that the terminal devices in area 1 and area 2 are not evenly distributed, as shown in FIG. 9 where the number of terminal devices in area 1 is significantly greater than that in area 2, if the second terminal device is located in area 1 and still uses the existing first threshold to determine the selected random access type, there may occur the case where too many terminal devices use the same random access procedure as the second terminal device, which may cause the second terminal device to need to make multiple random access attempts, increasing the delay for the second terminal device to successfully access the network device. Based on this, it is proposed in an implementation of the present disclosure that the first threshold may be adjusted to avoid the case that too many terminal devices use the same random access procedure. As shown in FIG. 9, the network device may raise the first threshold, i.e., narrow the range of area 1 and enlarge the range of area 2, so as to exclude some terminal devices in the original area 1 from the adjusted area 1 and avoid the case that too many terminal devices select two-step random access for random access attempts.

Figure 10:
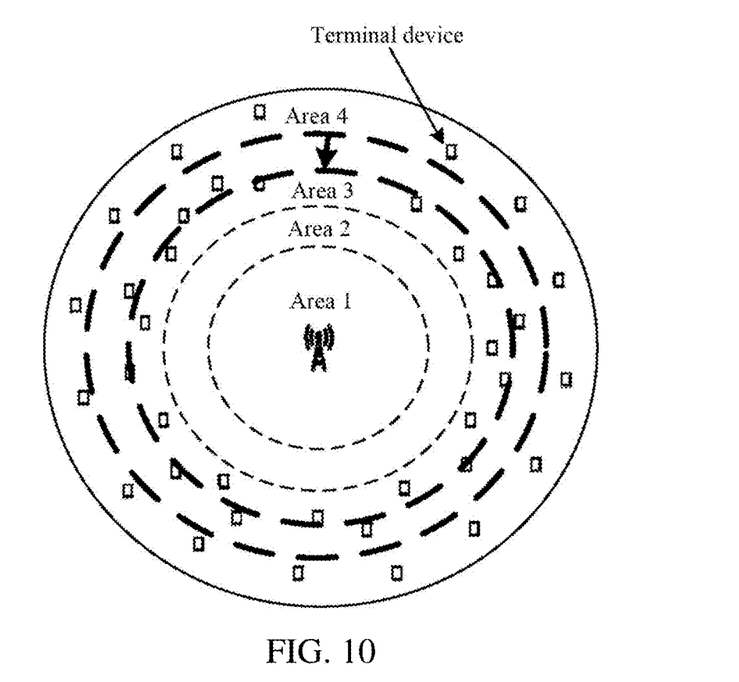
FIG. 10 is a schematic diagram of a method for adjusting a random access parameter according to another implementation of the present disclosure.

In another example, the random access parameter includes a second threshold. The second threshold is used for a second terminal device to select a random access type when using SUL for random access. Optionally, in an implementation of the present disclosure, the second threshold may be rsrp-ThresholdTwoStepRA-SUL described in the above implementation. As shown in FIG. 10, the second threshold is a demarcation between area 3 and area 4. When the second terminal devices are in area 3 and area 4, they all use SUL for random access. At this time, if the channel quality measurement result of the second terminal device is larger than the second threshold, two-step random access is selected, and if the channel quality measurement result of the second terminal device is less than the second threshold, four-step random access is selected. In the case where the network device determines, according to the random access report of the first terminal device, that the terminal devices in area 3 and area 4 are not evenly distributed, as shown in FIG. 10 where the number of terminal devices in area 3 is significantly greater than that in area 4, if the second terminal device is located in area 3 and still uses the existing second threshold to determine the selected random access type, there may occur the case where too many terminal devices use the same random access procedure as the second terminal device, which may cause the second terminal device to need to make multiple random access attempts, increasing the delay for the second terminal device to successfully access the network device. Based on this, it is proposed in an implementation of the present disclosure that the second threshold may be adjusted to avoid the case that too many terminal devices use the same random access procedure. As shown in FIG. 10, the network device may raise the second threshold, i.e., narrow the range of area 3 and enlarge the range of area 4, so as to exclude some terminal devices in the original area 3 from the adjusted area 3 and avoid the case that too many terminal devices select two-step random access for random access attempts.

It should be noted that, after understanding the technical solution of the present disclosure, a person skilled in the art will readily conceive other implementations, for example, the random access parameter may also include the first threshold and the second threshold at the same time, that is, the network device may adjust the first threshold and the second threshold at the same time according to the distribution situation in connection with the above two examples. For another example, the random access parameter may further include a third threshold, the third threshold is used for a second terminal device to select an uplink carrier type used, and the network device may also adjust the third threshold to ensure that the terminal devices are evenly distributed in the service range. All of the above shall be within the protection scope of the implementations of the present disclosure.

Figure 11:
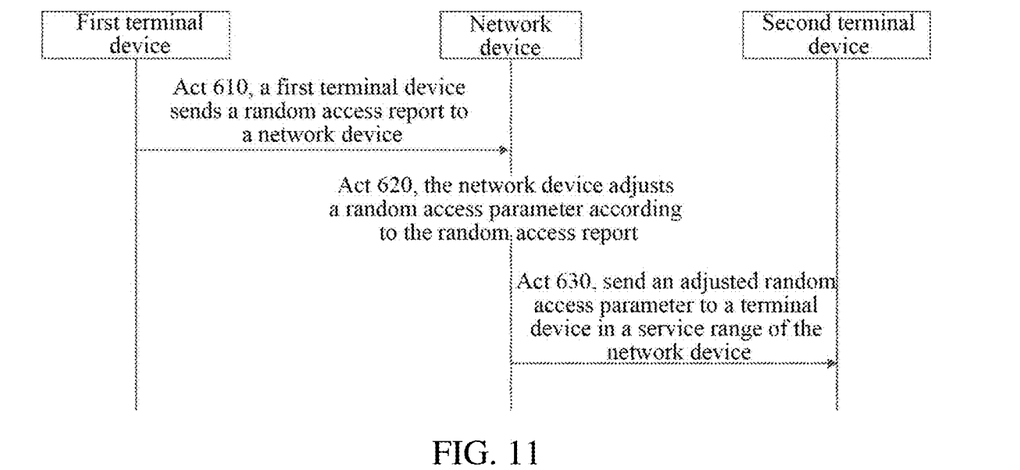
FIG. 11 is a flow chart of a method for adjusting a random access parameter according to a still further implementation of the present disclosure.

In another possible implementation, as shown in FIG. 11, the method further includes act 630.

In act 630, an adjusted random access parameter is sent to a terminal device in the service range of the network device.

After adjusting the random access parameter, the network device may send the adjusted random access parameter to the terminal devices in its service range, so that the terminal devices in its service range use the adjusted random access parameter to select a random access procedure, wherein the terminal devices in the service range of the network device include a second terminal device. Optionally, the network device may send the adjusted random access parameter to the terminal devices in its service range in the form of broadcast, i.e., the random access parameter may be carried in a system message.

To sum up, in a technical solution according to an implementation of the present disclosure, by sending a random access report to a network device by a terminal device which has completed random access, the random access report being used for the network device to adjust a random access parameter, a method for adjusting a random access parameter is provided. Moreover, in an implementation of the present disclosure, the random access report is used for indicating a random access situation of the terminal device that has completed random access, so that after receiving the random access report, the network device may analyze the situation of performing random access by the terminal device which has completed random access, and adjust a random access parameter based on the random access situation of the terminal device which has completed random access, such that the adjustment of the random access parameter can be more accurate and accords with the service quality of the current network device. In addition, in an implementation of the present disclosure, the random access parameter is used for a terminal device that has not completed random access to select a random access type. Terminal devices may be unevenly distributed in a service range of a network device. If the random access parameter is not adjusted, there may occur the case that multiple terminal devices use a same random access procedure to make random access attempts at the same time, which may eventually result in a relatively long delay for a terminal device to successfully access the network device and a relatively low efficiency of random access. In an implementation of the present disclosure, after mastering a distribution situation of the terminal devices in the service range of the network device according to the random access report of the terminal device that has completed random access, the network device may adjust the random access parameter to avoid the case that multiple terminal devices perform a same random access procedure, reduce the delay for a terminal device to successfully access the network device, and improve the efficiency of random access.

In addition, in a technical solution according to an implementation of the present disclosure, the random access report sent by a terminal device which has completed random access includes, but is not limited to, a random access type selected by the terminal device, a channel quality measurement result, and indication information indicating a relationship between the channel quality measurement result and a random access parameter. By analyzing the information, the network device may determine the random access procedure performed by the terminal device which has completed random access, thus facilitating the network device in analyzing the distribution situation of terminal devices in the service range of the network device.

In addition, in a technical solution according to an implementation of the present disclosure, the random access parameter may include a first threshold and a second threshold. The first threshold is used for a terminal device which has not completed random access to select a random access type when using NUL for random access, and the second threshold is used for a terminal device which has not completed random access to select a random access type when using SUL for random access. By adjusting the first threshold and/or the second threshold, the network device may enable the terminal devices in its service range to use different random access procedures for random access attempts, thereby providing specific contents that the random access parameter may include, and providing a specific manner in which the network device adjusts the random access parameter.

It should be noted that in the above method implementation, the technical solution of the present disclosure is described mainly from the perspective of interaction among the first terminal device, the network device and the second terminal device. The above acts performed by the first terminal device may be realized separately as a method for adjusting a random access parameter on the first terminal device side; the above acts performed by the network device may be realized separately as a method for adjusting a random access parameter on the network device side; and the above acts performed by the second terminal device may be realized separately as a method for adjusting a random access parameter on the second terminal device side.

The following are apparatus implementations of the present disclosure, which may be used for implementing the method implementations of the present disclosure. For details not disclosed in the apparatus implementations of the present disclosure, please refer to the method implementations of the present disclosure.

Figure 12:
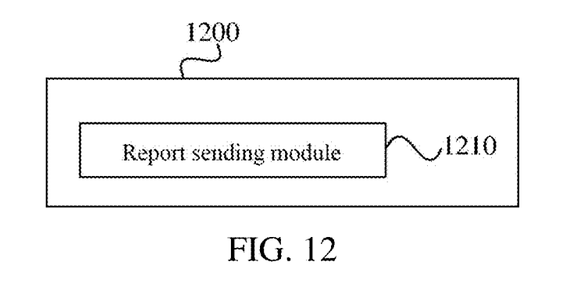
FIG. 12 is a block diagram of an apparatus for adjusting a random access parameter according to an implementation of the present disclosure.

Referring to FIG. 12, FIG. 12 is a block diagram of an apparatus for adjusting a random access parameter according to an implementation of the present disclosure. The apparatus has a function of implementing the method examples of the first terminal device side described above.

The function may be accomplished by hardware or by executing corresponding software by hardware. The apparatus may be the first terminal device described above or may be arranged in the first terminal device. As shown in FIG. 12, the apparatus 1200 may include a report sending module 1210.

The report sending module 1210 is configured to send a random access report to a network device, the random access report being used for indicating a random access situation of the first terminal device; the random access report being used for the network device to adjust a random access parameter.

The random access parameter is used for a second terminal device to select a random access type, and the random access type includes two-step random access and four-step random access.

Optionally, the random access report includes at least one of the following information: a random access type selected by the first terminal device; a channel quality measurement result collected by the first terminal device; and first indication information, wherein the first indication information is used for indicating the relationship between the channel quality measurement result collected by the first terminal device and the random access parameter.

Optionally, the random access report further includes: a value of absolute frequency point A. The value of absolute frequency point A represents an absolute frequency of a resource block related to a random access resource, and is used for the network device to determine an uplink carrier type used by the first terminal device, the uplink carrier type includes a normal uplink carrier NUL and a supplementary uplink carrier SUL.

Optionally, the random access parameter includes a first threshold, wherein the first threshold is used for the second terminal device to select the random access type when using NUL for random access.

Optionally, the random access parameter includes a second threshold, wherein the second threshold is used for the second terminal device to select the random access type when using SUL for random access.

To sum up, in a technical solution according to an implementation of the present disclosure, by sending a random access report to a network device by a terminal device which has completed random access, the random access report being used for the network device to adjust a random access parameter, a method for adjusting a random access parameter is provided. Moreover, in an implementation of the present disclosure, the random access report is used for indicating a random access situation of the terminal device that has completed random access, so that after receiving the random access report, the network device may analyze the situation of performing random access by the terminal device which has completed random access, and adjust a random access parameter based on the random access situation of the terminal device which has completed random access, such that the adjustment of the random access parameter can be more accurate and accords with the service quality of the current network device. In addition, in an implementation of the present disclosure, the random access parameter is used for a terminal device that has not completed random access to select a random access type. Terminal devices may be unevenly distributed in a service range of a network device. If the random access parameter is not adjusted, there may occur the case that multiple terminal devices use a same random access procedure to make random access attempts at the same time, which may eventually result in a relatively long delay for a terminal device to successfully access the network device and a relatively low efficiency of random access. In an implementation of the present disclosure, after mastering a distribution situation of the terminal devices in the service range of the network device according to the random access report of the terminal device that has completed random access, the network device may adjust the random access parameter to avoid the case that multiple terminal devices perform a same random access procedure, reduce the delay for a terminal device to successfully access the network device, and improve the efficiency of random access.

Figure 13:
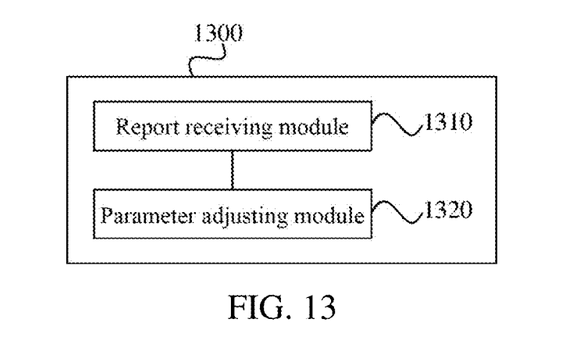
FIG. 13 is a block diagram of an apparatus for adjusting a random access parameter according to another implementation of the present disclosure.

Referring to FIG. 13, FIG. 13 is a block diagram of an apparatus for adjusting a random access parameter according to an implementation of the present disclosure. The apparatus has a function of implementing the method example of the network device side described above. The function may be accomplished by hardware or by executing corresponding software by hardware. The apparatus may be the network device described above or may be arranged in the network device. As shown in FIG. 13, the apparatus 1300 may include: a report receiving module 1310 and a parameter adjusting module 1320.

The report receiving module 1310 is configured to receive a random access report sent by a first terminal device, the random access report being used for indicating a random access situation of the first terminal device.

The parameter adjusting module 1320 is configured to adjust a random access parameter according to the random access report; wherein the random access parameter is used for a second terminal device to select a random access type, and the random access type includes two-step random access and four-step random access.

Optionally, the parameter adjusting module 1320 is configured to: determine a distribution situation of the first terminal devices in a service range of the network device according to the random access report; and adjust the random access parameter according to the distribution situation.

Optionally, the random access report includes at least one of the following information: a random access type selected by the first terminal device; a channel quality measurement result collected by the first terminal device; and first indication information, wherein the first indication information is used for indicating the relationship between the channel quality measurement result collected by the first terminal device and the random access parameter.

Optionally, the random access report further includes: a value of absolute frequency point A. The value of absolute frequency point A is used for the network device to determine an uplink carrier type used by the first terminal device, the uplink carrier type includes a normal uplink carrier NUL and a supplementary uplink carrier SUL.

Optionally, the random access parameter includes a first threshold, wherein the first threshold is used for the second terminal device to select the random access type when using NUL for random access.

Optionally, the random access parameter includes a second threshold, wherein the second threshold is used for the second terminal device to select the random access type when using SUL for random access.

Figure 14:
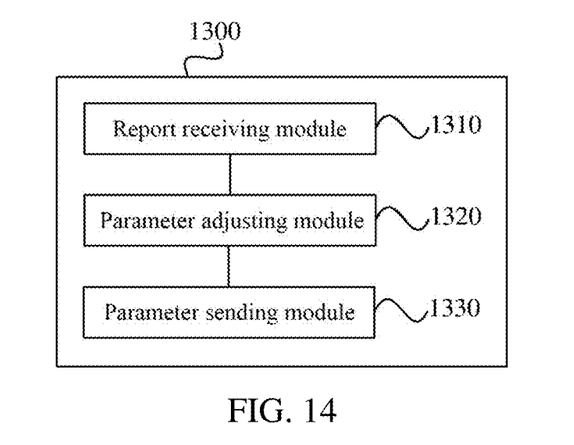
FIG. 14 is a block diagram of an apparatus for adjusting a random access parameter according to a further implementation of the present disclosure.

Optionally, as shown in FIG. 14, the apparatus 1300 further includes a parameter sending module 1330 configured to send an adjusted random access parameter to the terminal device in the service range of the network device.

To sum up, in a technical solution according to an implementation of the present disclosure, by sending a random access report to a network device by a terminal device which has completed random access, the random access report being used for the network device to adjust a random access parameter, a method for adjusting a random access parameter is provided. Moreover, in an implementation of the present disclosure, the random access report is used for indicating a random access situation of the terminal device that has completed random access, so that after receiving the random access report, the network device may analyze the situation of performing random access by the terminal device which has completed random access, and adjust a random access parameter based on the random access situation of the terminal device which has completed random access, such that the adjustment of the random access parameter can be more accurate and accords with the service quality of the current network device. In addition, in an implementation of the present disclosure, the random access parameter is used for a terminal device that has not completed random access to select a random access type. Terminal devices may be unevenly distributed in a service range of a network device. If the random access parameter is not adjusted, there may occur the case that multiple terminal devices use a same random access procedure to make random access attempts at the same time, which may eventually result in a relatively long delay for a terminal device to successfully access the network device and a relatively low efficiency of random access. In an implementation of the present disclosure, after mastering a distribution situation of the terminal devices in the service range of the network device according to the random access report of the terminal device that has completed random access, the network device may adjust the random access parameter to avoid the case that multiple terminal devices perform a same random access procedure, reduce the delay for a terminal device to successfully access the network device, and improve the efficiency of random access.

It should be noted that division of the aforementioned functional modules is just taken as an example for description when the apparatus provide in the aforementioned implementation implements its function, and in a practical application, the aforementioned function may be allocated to and accomplished by different functional modules as actually required, that is, a content structure of the device is divided into different functional modules to accomplish all or part of the aforementioned functions.

With regard to the apparatus in the above implementations, the specific manner in which the respective modules perform operations has been described in detail in the implementations relating to the method and will not be described in detail here.

Figure 15:
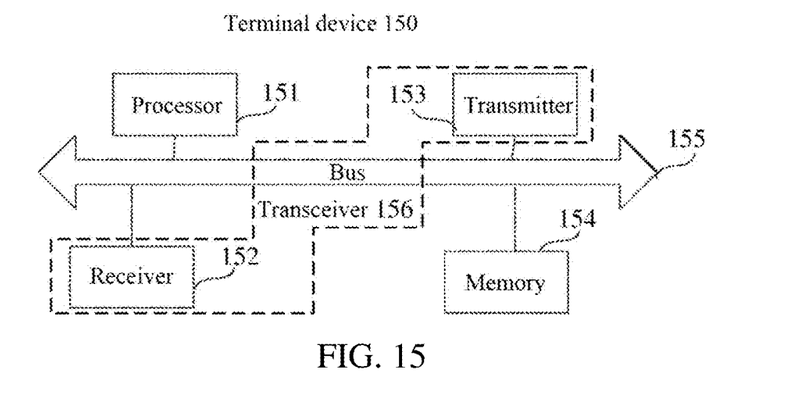
FIG. 15 is a structure block diagram of a terminal device according to an implementation of the present disclosure.

Referring to FIG. 15, FIG. 15 is a schematic structure diagram of a terminal device 150 according to an implementation of the present disclosure. For example, the terminal device may be the terminal device described above, and is configured to perform the method for adjusting a random access parameter on the terminal device side. Specifically, the terminal device 150 may include: a processor 151, a receiver 152, a transmitter 153, a memory 154 and a bus 155.

The processor 151 includes one or more processing cores. The processor 151 executes various functional applications and information processing by running software programs and modules.

The receiver 152 and the transmitter 153 may be implemented as a transceiver 156, and the transceiver 156 may be a communication chip.

The memory 154 is connected to the processor 151 via the bus 155.

The memory 154 may be configured to store a computer program, and the processor 151 is configured to execute the computer program to implement the various acts performed by the first terminal device in the above method implementation.

In addition, the memory 154 may be implemented by any type of transitory or non-transitory storage device or a combination thereof. The transitory or non-transitory storage device includes, but is not limited to: Random-Access Memory (RAM) and Read-Only Memory (ROM), Erasable Programmable Read-Only Memory (EPROM), Electrically Erasable Programmable Read-Only Memory (EEPROM), flash memory or other solid-state storage technology, Compact Disc Read-Only Memory (CD-ROM), Digital Video Disc (DVD) or other optical storage, magnetic cassette, magnetic tape, magnetic disk storage or other magnetic storage devices.

The transceiver 156 is configured to send a random access report to a network device, the random access report being used for indicating a random access situation of the first terminal device; the random access report being used for the network device to adjust a random access parameter.

The random access parameter is used for a second terminal device to select a random access type, and the random access type includes two-step random access and four-step random access.

Optionally, the random access report includes at least one of the following information: a random access type selected by the first terminal device; a channel quality measurement result collected by the first terminal device; and first indication information. Wherein the first indication information is used for indicating the relationship between the channel quality measurement result collected by the first terminal device and the random access parameter.

Optionally, the random access report further includes: a value of absolute frequency point A. The value of absolute frequency point A represents an absolute frequency of a resource block related to a random access resource, and is used for the network device to determine an uplink carrier type used by the first terminal device, the uplink carrier type including a normal uplink carrier NUL and a supplementary uplink carrier SUL.

Optionally, the random access parameter includes a first threshold, wherein the first threshold is used for the second terminal device to select the random access type when using NUL for random access.

Optionally, the random access parameter includes a second threshold, wherein the second threshold is used for the second terminal device to select the random access type when using SUL for random access.

Figure 16:
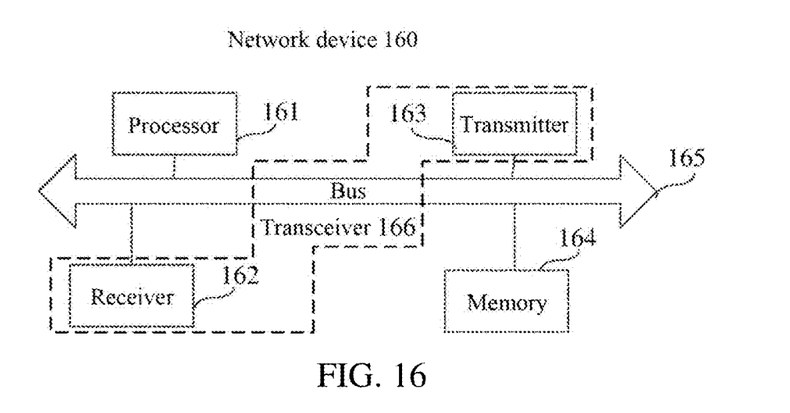
FIG. 16 is a structure block diagram of a network device according to an implementation of the present disclosure.

Referring to FIG. 16, FIG. 16 is a schematic structural diagram of a network device 160 according to an implementation of the present disclosure. For example, the network device may be the network device described above, and is configured to perform the method for adjusting a random access parameter on the network device side. Specifically, the network device 160 may include: a processor 161, a receiver 162, a transmitter 163, a memory 164 and a bus 165.

The processor 161 includes one or more processing cores. The processor 161 performs various functional applications and information processing by running software programs and modules.

The receiver 162 and the transmitter 163 may be implemented as a transceiver 166, and the transceiver 166 may be a communication chip.

The memory 164 is connected to the processor 161 via the bus 165.

The memory 164 may be configured to store a computer program, and the processor 161 is configured to execute the computer program to implement the various acts performed by the network device in the above method implementation.

In addition, the memory 164 may be implemented by any type of transitory or non-transitory storage device or a combination thereof. The transitory or non-transitory storage device includes, but is not limited to: Random-Access Memory (RAM) and Read-Only Memory (ROM), Erasable Programmable Read-Only Memory (EPROM), Electrically Erasable Programmable Read-Only Memory (EEPROM), flash memory or other solid-state storage technology, Compact Disc Read-Only Memory (CD-ROM), Digital Video Disc (DVD) or other optical storage, magnetic cassette, magnetic tape, magnetic disk storage or other magnetic storage devices.

The transceiver 166 is configured to receive a random access report sent by a first terminal device, the random access report being used for indicating a random access situation of the first terminal device.

The processor 161 is configured to adjust a random access parameter according to the random access report; wherein the random access parameter is used for a second terminal device to select a random access type, and the random access type includes two-step random access and four-step random access.

Optionally, the processor 161 is configured to: determine a distribution situation of the first terminal devices in a service range of the network device according to the random access report; and adjust the random access parameter according to the distribution situation.

Optionally, the random access report includes at least one of the following information: a random access type selected by the first terminal device; a channel quality measurement result collected by the first terminal device; and first indication information; wherein the first indication information is used for indicating the relationship between the channel quality measurement result collected by the first terminal device and the random access parameter.

Optionally, the random access report further includes: a value of absolute frequency point A. The value of absolute frequency point A is used for the network device to determine an uplink carrier type used by the first terminal device, the uplink carrier type including a normal uplink carrier NUL and a supplementary uplink carrier SUL.

Optionally, the random access parameter includes a first threshold, wherein the first threshold is used for the second terminal device to select the random access type when using NUL for random access.

Optionally, the random access parameter includes a second threshold, wherein the second threshold is used for the second terminal device to select the random access type when using SUL for random access.

Optionally, the processor 161 is further configured to send an adjusted random access parameter to the terminal device in the service range of the network device.

An implementation of the present disclosure further provides a computer-readable storage medium, storing a computer program, the computer program is used for being executed by a processor of a terminal device to implement the method for adjusting a random access parameter on a first terminal device side.

An implementation of the present disclosure further provides a computer-readable storage medium, storing a computer program, the computer program is used for being executed by a processor of a network device to implement the method for adjusting a random access parameter on a network device side.

An implementation of the present disclosure further provides a chip, including a programmable logic circuit and/or a program instruction, which is used for implementing the method for adjusting a random access parameter on a first terminal device side, when the chip is run on a terminal device.

An implementation of the present disclosure further provides a chip, including a programmable logic circuit and/or a program instruction, which is used for implementing the method for adjusting a random access parameter on a network device side, when the chip is run on a network device.

The present disclosure further provides a computer program product, which, when run on a terminal device, causes a computer to perform the method for adjusting a random access parameter on the first terminal device side.

The present disclosure further provides a computer program product, which, when run on a network device, causes a computer to perform the method for adjusting a random access parameter on the network device side.

A person skilled in the art may appreciate that, in one or more examples described above, functions described in the implementations of the present disclosure may be implemented using hardware, software, firmware, or any combination thereof. When implemented using software, these functions may be stored in a computer-readable medium or be transmitted as one or more instructions or codes on the computer-readable medium. The computer-readable medium includes a computer storage medium and a communication medium, wherein the communication medium includes any medium facilitating transfer of a computer program from one place to another place. The storage medium may be any available medium that can be accessed by a general-purpose or special-purpose computer.

The above are only exemplary implementations of the present disclosure, which are not intended to limit the present disclosure. Any modification, equivalent substitution, improvement, etc., made within the spirit and principles of the present disclosure shall be included in the protection scope of the present disclosure.

The invention claimed is:

1. A method for adjusting a random access parameter, applied to a first terminal device, comprising:
sending a random access report to a network device, wherein the random access report is used for indicating a random access situation of the first terminal device, the random access report is used for the network device to adjust a random access parameter;
wherein the random access parameter is used for a second terminal device to select a random access type, and the random access type comprises two-step random access and four-step random access; wherein the random access report comprises a channel quality measurement result collected by the first terminal device; wherein the random access report further comprises: a value of absolute frequency point A, the value of absolute frequency point A represents an absolute frequency of a resource block related to a random access resource and is used for the network device to determine an uplink carrier type used by the first terminal device, the uplink carrier type comprises a normal uplink carrier NUL and a supplementary uplink carrier SUL.

2. The method of claim 1, wherein the random access parameter comprises a first threshold, wherein the first threshold is used for the second terminal device to select the random access type when using NUL for random access.

3. The method of claim 1, wherein the random access parameter comprises a second threshold, wherein the second threshold is used for the second terminal device to select the random access type when using SUL for random access.

4. An apparatus for adjusting a random access parameter, applied to a first terminal device, comprising a processor and a transceiver connected with the processor, wherein the transceiver is configured to send a random access report to a network device, wherein the random access report is used for indicating a random access situation of the first terminal device, the random access report is used for the network device to adjust a random access parameter;

wherein the random access parameter is used for a second terminal device to select a random access type, and the random access type comprises two-step random access and four-step random access; wherein the random access report comprises a channel quality measurement result collected by the first terminal device; wherein the random access report further comprises: a value of absolute frequency point A, the value of absolute frequency point A represents an absolute frequency of a resource block related to a random access resource and is used for the network device to determine an uplink carrier type used by the first terminal device, the uplink carrier type comprises a normal uplink carrier NUL and a supplementary uplink carrier SUL.

5. The apparatus of claim 4, wherein the random access parameter comprises a first threshold, wherein the first threshold is used for the second terminal device to select the random access type when using NUL for random access.

6. The apparatus of claim 4, wherein the random access parameter comprises a second threshold, wherein the second threshold is used for the second terminal device to select the random access type when using SUL for random access.

7. An apparatus for adjusting a random access parameter, applied to a network device, comprising: a processor and a transceiver connected with the processor, wherein the transceiver is configured to receive a random access report sent by a first terminal device, wherein the random access report is used for indicating a random access situation of the first terminal device; and the processor is configured to adjust a random access parameter according to the random access report; wherein the random access parameter is used for a second terminal device to select a random access type, and the random access type comprises two-step random access and four-step random access; wherein the random access report comprises a channel quality measurement result collected by the first terminal device; wherein the random access report further comprises: a value of absolute frequency point A, the value of absolute frequency point A is used for the network device to determine an uplink carrier type used by the first terminal device, the uplink carrier type comprises a normal uplink carrier NUL and a supplementary uplink carrier SUL.

8. The apparatus of claim 7, wherein the processor is configured to:

determine a distribution situation of first terminal devices in a service range of the network device according to the random access report; and adjust the random access parameter according to the distribution situation.

9. The apparatus of claim 7, wherein the random access parameter comprises a first threshold, wherein the first threshold is used for the second terminal device to select the random access type when using NUL for random access.

10. The apparatus of claim 7, wherein the random access parameter comprises a second threshold, wherein the second threshold is used for the second terminal device to select the random access type when using SUL for random access.

11. The apparatus of claim 7, wherein the transceiver is further configured to send an adjusted random access parameter to a terminal device in a service range of the network device.

* * * * *